United States Patent [19]
Wallace et al.

[11] 3,741,390
[45] June 26, 1973

[54] TERTIARY FILTER

[75] Inventors: Grover L. Wallace; Thomas D. Ward; Paul R. Johnson, all of Mineral Wells, Tex.

[73] Assignee: Harsco Corppration, Wormleysburg, Pa.

[22] Filed: Dec. 13, 1971

[21] Appl. No.: 207,111

[52] U.S. Cl. .................. 210/80, 210/108, 210/138, 210/274, 210/275
[51] Int. Cl. .......................................... B01d 23/24
[58] Field of Search .................... 210/80, 82, 108, 210/138, 333, 264, 274, 277, 275

[56] References Cited
UNITED STATES PATENTS

| | | | |
|---|---|---|---|
| 3,447,684 | 6/1969 | Morrison | 210/108 |
| 3,473,661 | 10/1969 | Duff | 210/108 X |
| 3,342,334 | 9/1967 | Soriente et al. | 210/108 |
| 2,935,195 | 5/1960 | Dunn | 210/108 X |
| 3,111,486 | 11/1963 | Soriente | 210/108 |
| 3,459,302 | 8/1969 | Ross | 210/80 |

*Primary Examiner*—John Adee
*Attorney*—William B. Kerkam, Jr.

[57] ABSTRACT

A method and apparatus for filtering liquid wherein contaminated liquid is delivered selectively to first and second filter tanks having filter media disposed therein. The contaminated liquid, filtered through one of the filter tanks, is delivered to a backwash storage tank where a predetermined volume of filtered liquid is maintained. When the filter in the first tank becomes partially clogged with solid particles removed from the contaminated liquid, flow of contaminated liquid is diverted to a second filter tank and liquid which has been filtered is pumped from the backwash storage tank through the first filter for cleaning. An automatic control system is provided for automatic switching of flow between the first and second filter tanks and for controlling the backwash cycle.

13 Claims, 12 Drawing Figures

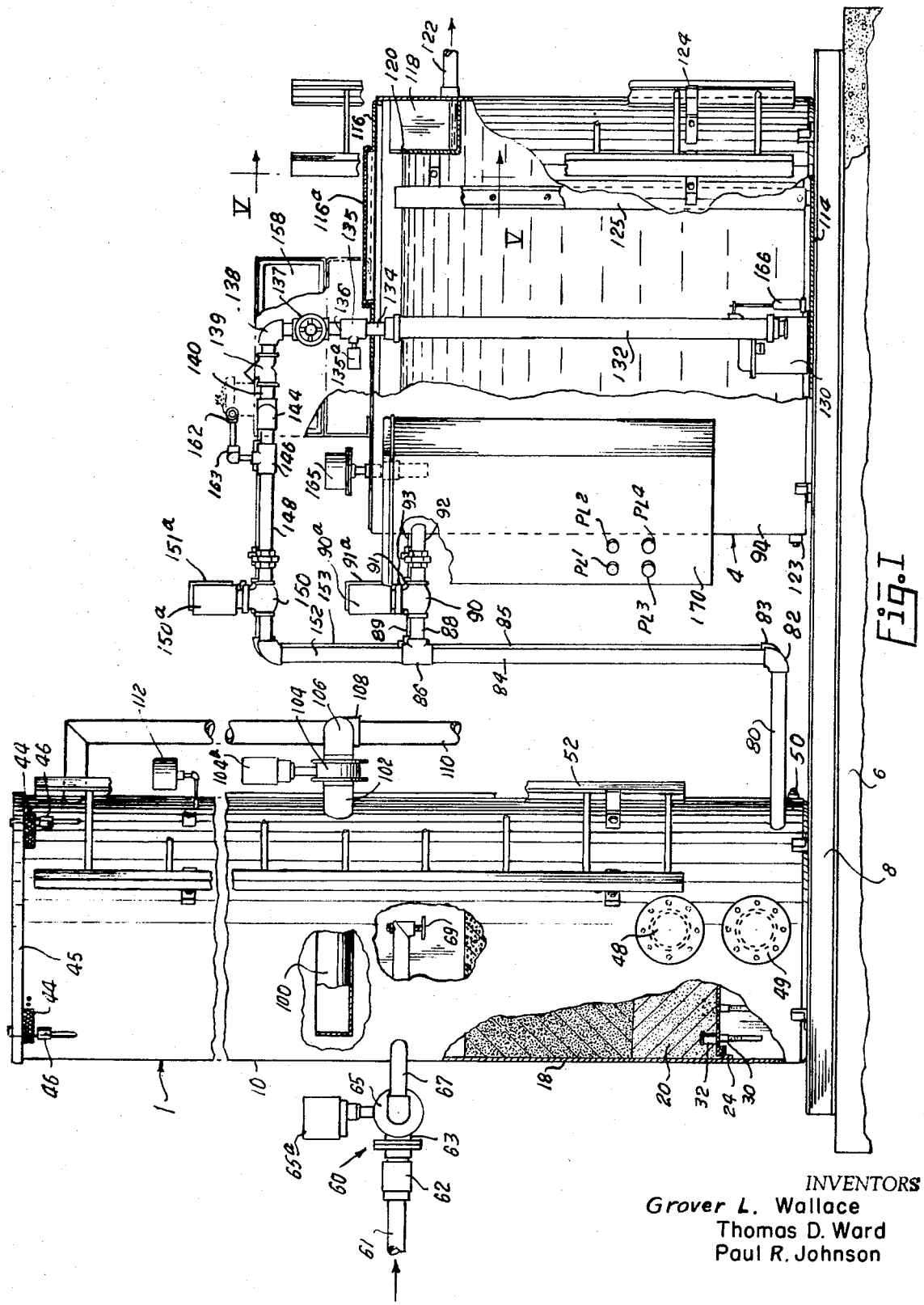

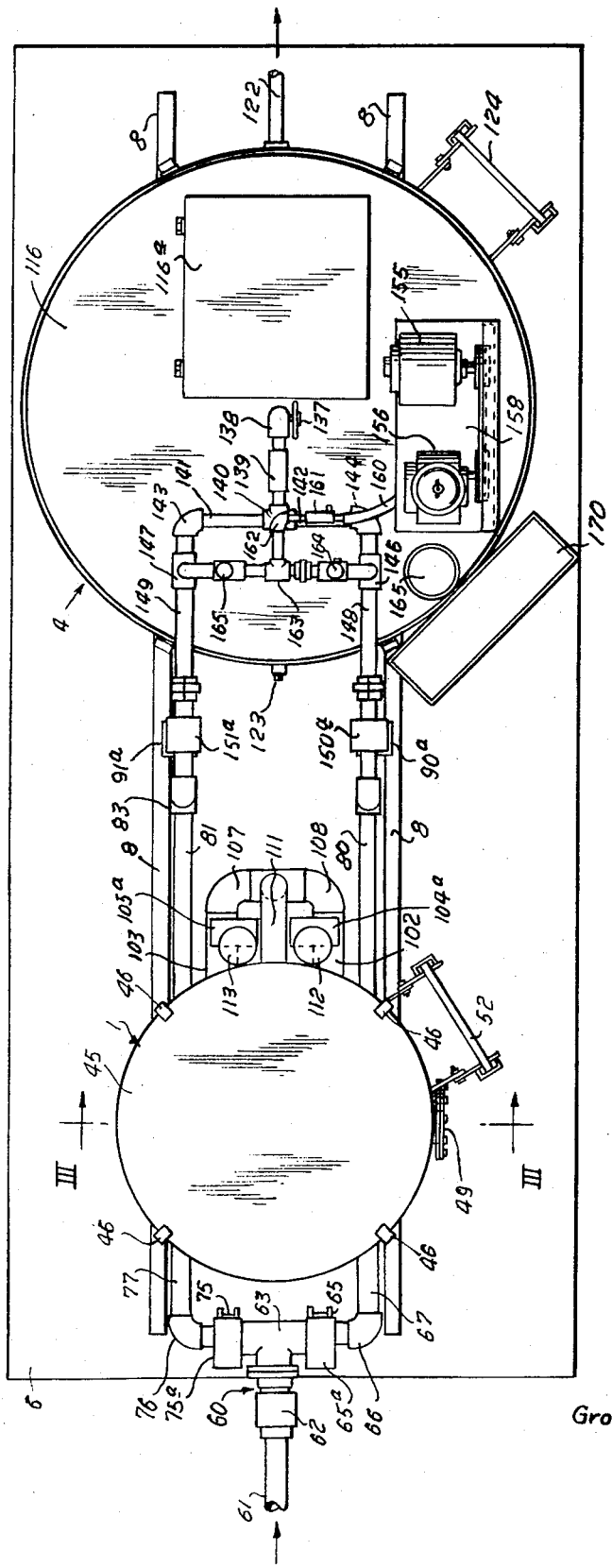
Fig. II
INVENTORS
Grover L. Wallace
Thomas D. Ward
Paul R. Johnson

PATENTED JUN 26 1973 3,741,390
SHEET 3 OF 5
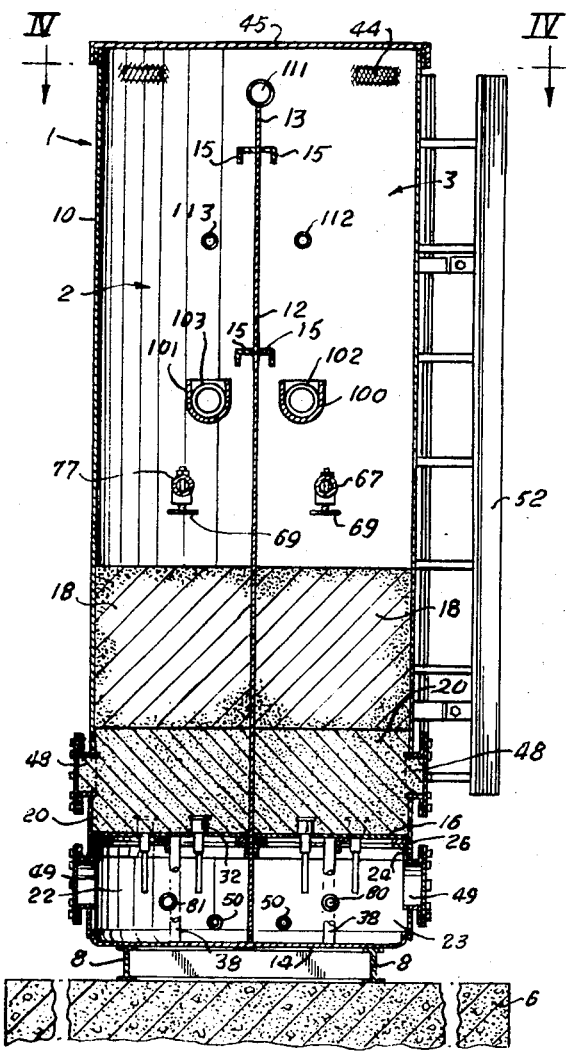
Fig. III
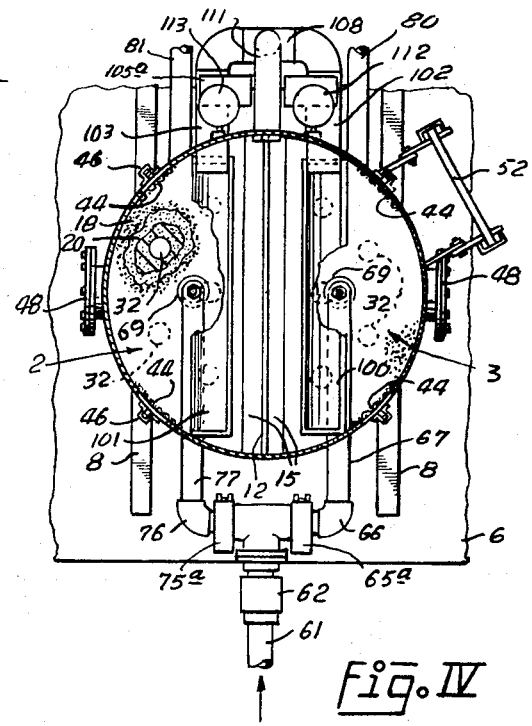
Fig. IV
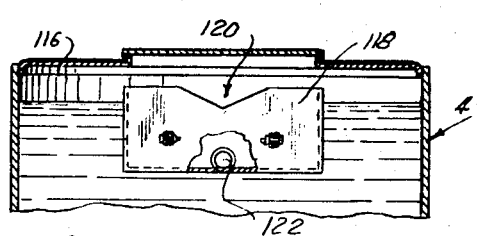
Fig. V
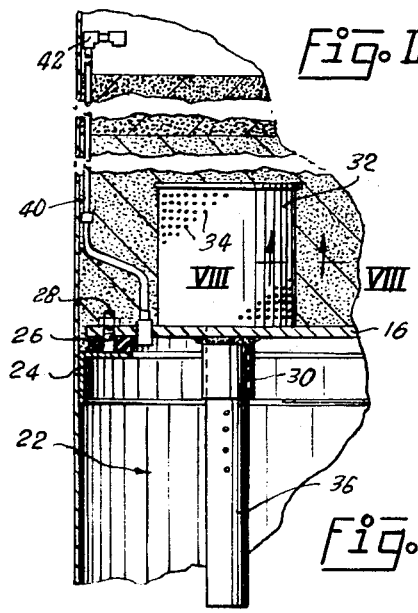
Fig. VII
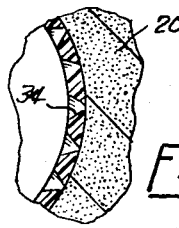
Fig. VIII
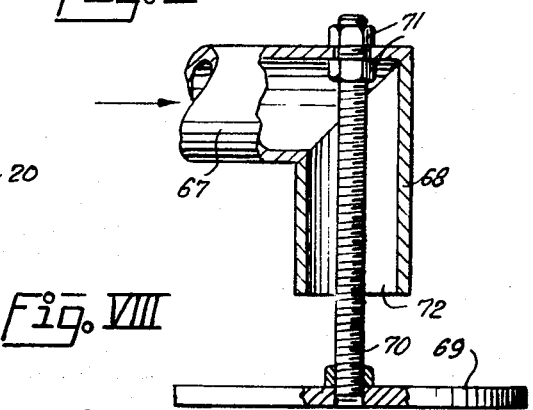
Fig. VI
INVENTORS
Grover L. Wallace
Thomas D. Ward
Paul R. Johnson

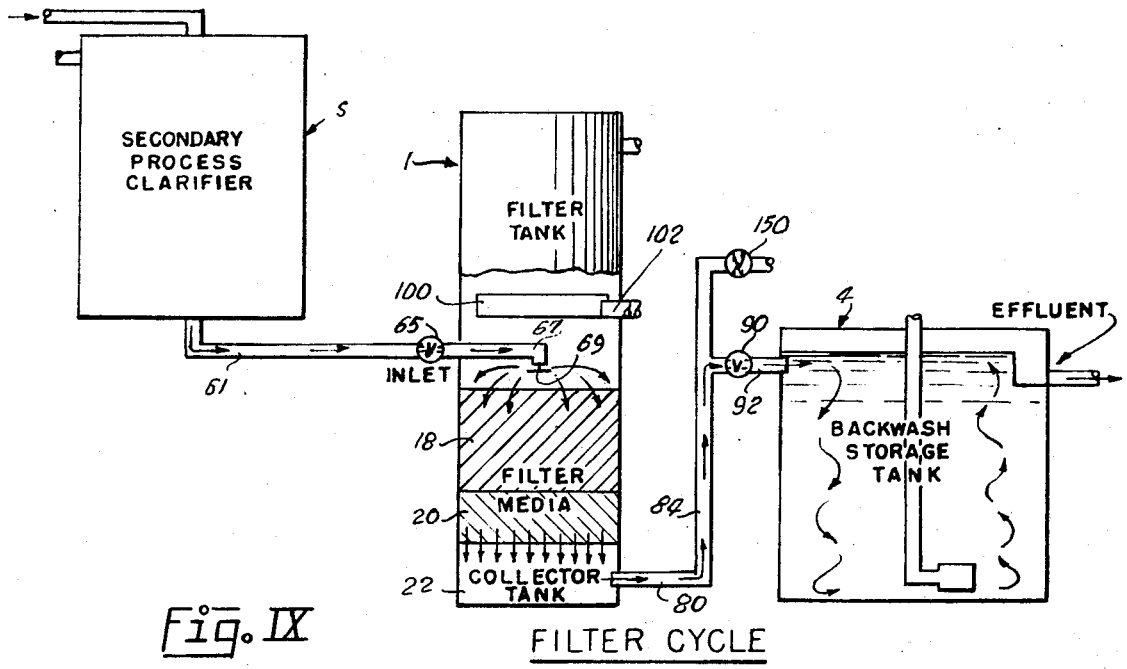
Fig. IX — FILTER CYCLE
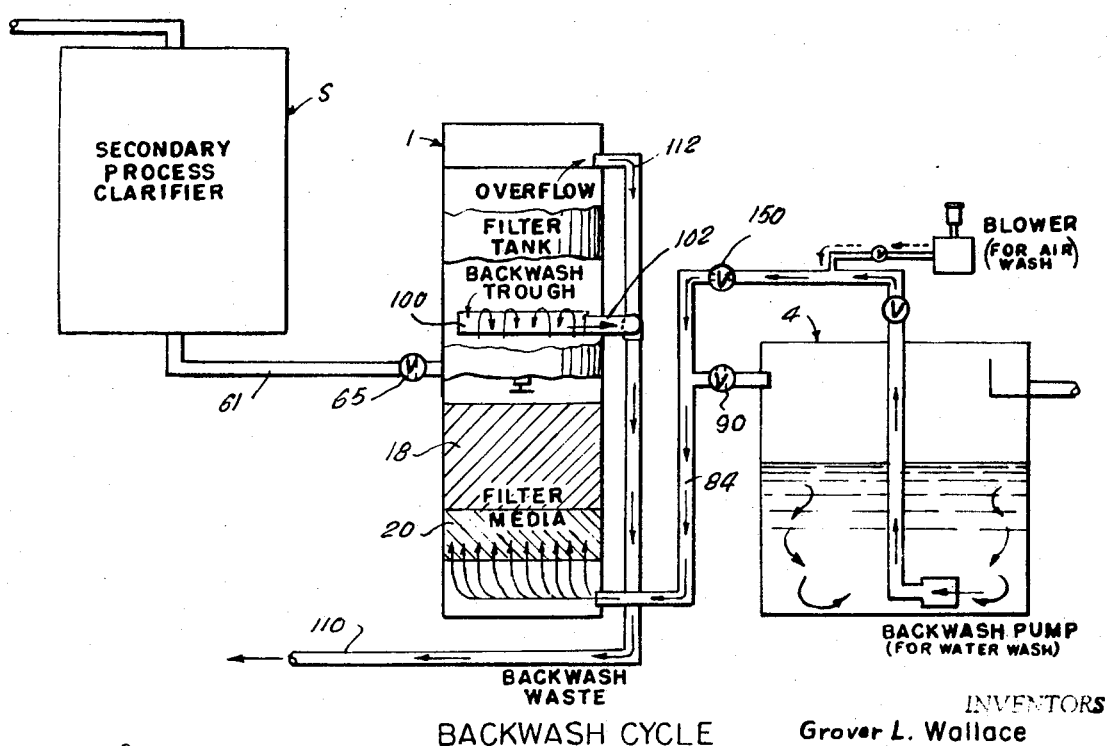
Fig. X — BACKWASH CYCLE
INVENTORS
Grover L. Wallace
Thomas D. Ward
Paul R. Johnson

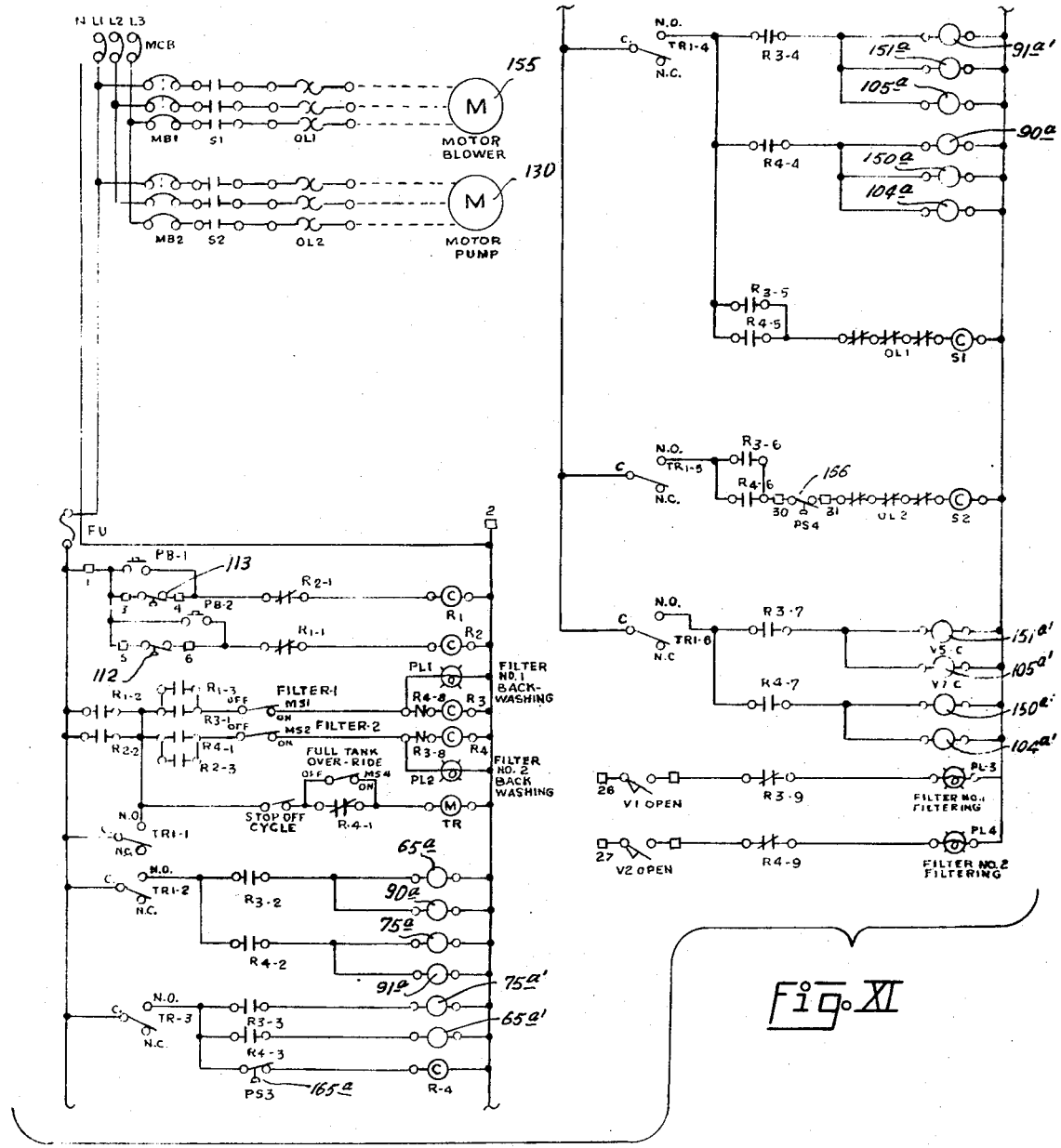
Fig. XI
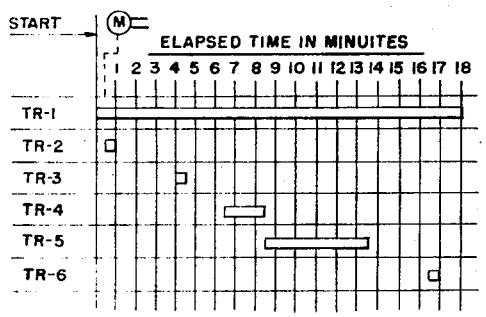
Fig. XII
INVENTORS
Grover L. Wallace
Thomas D. Ward
Paul R. Johnson

TERTIARY FILTER

BACKGROUND OF INVENTION

Requirement by regulatory agencies for waste effluent quality which exceeds the performance capability of typical secondary sewage treatment systems has prompted developement of various third stage "tertiary" systems to further purify effluent to prevent pollution of streams, lakes and harbors. Since filtration through sand and gravel has been utilized heretofore for removal of suspended solids from water supplies, most prefabricated waste treatment equipment manufacturers have adopted these proven application principals, modifying the media gradation and the material to provide so called "deep-bed" filtration effects. Such affords a method of obtaining prolonged filter cycles prior to backwashing which is necessary to remove the filter particles trapped in the media.

Heretofore it has been necessary to provide holding tanks or other suitable accommodations for temporary storage of effluent from the secondary treatment system to allow removal of filtered particles trapped in the filtration media. Difficulties are encountered in treatment of normal flow from the secondary system in addition to the volume which was accumulated in the holding tank. Tertiary filters heretofore devised have for the most part been manually controlled requiring constant surveillance of an operator to monitor operation of the filter apparatus to accommodate fluctuations in flow and solids delivered thereto.

SUMMARY OF INVENTION

We have developed a tertiary filter unit for operation in conjunction with a larger system of waste collection and treatment. The improved filter system has automatic control apparatus associated with dual filter units allowing filtration through the first unit while filtered solid material is being removed from a second unit. The automatic control apparatus is adapted to sense a condition wherein one of the filters has become clogged and to automatically switch flow to the other unit while initiating a controlled backwash cycle wherein pressurized air is forced through the clogged filter media, assuring proper bed expansion and uniform agitation, prior to circulating wash water to flush solids out of the media.

The filter apparatus comprises first and second filter units to which effluent from the secondary treatment system is delivered through inlet distributors spaced veritically from the upper surface of graded filtration material. Liquid passing through the filtration media is delivered to a backwash storage tank providing a quantity of filtered water to be pumped in a reverse direction through the filtration media for cleaning same.

The automatic control system comprises sensors and valves arranged to divert flow of fluid to the second filter unit when the liquid level in a first filter unit reaches a predetermined level indicating that the filtration media is not passing liquid at a desired rate and needs cleaning. Simultaneously with switching flow from the second filter unit, a programmed sequence of events is initated wherein air and water are forced through the filter media to agitate the bed and wash filtered particles therefrom. The contaminated backwash water may then be delivered if desired to a previous stage of the sewage treatment system for further treatment prior to being returned to the tertiary filter.

A primary object of the invention is to provide a filtration system adapted to provide continuous duty filtration of effluent delivered from a secondary treatment facility eliminating holding tanks and attendant difficulties.

Another object of the invention is to provide a filtration system having a plurality of filtration units adapted for automatic control of filtration and backwash cycles.

A further object of the invention is to provide a filtration system capable of removing at least 85 percent of the suspended solids from normal effluent from a domestic secondary treatment plant containing 5 to 20 parts per million suspendéd solids such that the effluent from the filtration unit has less than 5 parts per million suspended solids.

A still further object of the invention is to provide a filtration system comprising dual filtration units adapted to provide continuous duty operation in the event of power failure or temporary malfunction of the control circuit.

A still further object of the invention is to provide a filtration system particularly adapted for use with secondary sewage treatment systems to purify effluent delivered therefrom to prevent pollution of streams, lakes and harbors.

A still further object of the invention is to provide a filtration system having filtration units providing continuous filtration of effluent through one of the filtration units while the other is being cleaned thereby reducing the size and cost of the tertiary filtration system making the use thereof economically feasible in combination with existing sewage treatment facilities.

Other and further objects of the invention will become apparent upon referring to the detailed description hereinafter following and the drawings annexed hereto.

DESCRIPTION OF DRAWING

Drawings of a preferred embodiment of our invention are annexed hereto so that the invention may be better and more fully understood, in which;

FIG. I is an elevational view of the filtration system and the backwash storage tank, parts being broken away to more clearly illustrate details of construction;

FIG. II is a plan view;

FIG. III is a cross-sectional view taken substantially along line III—III of FIG. II;

FIG. IV is a cross-sectional view taken substantially along line IV—IV of FIG. III.

FIG. V is a cross-sectional view taken substantially along line V—V of FIG. I;

FIG. VI is an enlarged partially sectionalized view of the inlet distributor;

FIG. VII is an enlarged fragmentary cross-sectional view through the bed of filtration media illustrating details of construction of an underdrain screen;

FIG. VIII is a cross-sectional view taken substantially along line VIII—VIII of FIG. VII;

FIG. IX is a flow diagram illustrating a filter cycle;

FIG. X is a flow diagram illustrating a backwash cycle;

FIG. XI is a wiring diagram of a control system; and

FIG. XII is a schematic representation of the master control timer program.

Numeral references are employed to designate the various parts shown in the drawings and like numerals indicate like parts throughout the various figures of the drawings.

DESCRIPTION OF A PREFERRED EMBODIMENT

Referring to FIGS. I and II of the drawing, the numeral 1 generally designates filter apparatus having a plurality of filter tanks 2 and 3 formed therein arranged to filter effluent from a secondary sewage treatment system and to deliver the filtered liquid to a backwash storage tank 4.

The filtration system is preferably mounted on a concrete base slab 6 and the load is distributed thereover by suitable supporting structure such as spaced I-beams 8.

Filter apparatus 1 comprises a plurality of filter tank units preferably in a common cylindircal housing 10 having a divider plate 12 extending therethrough forming compartments 2 and 3 on opposite sides thereof. Housing 10 is preferably fabricated from steel plates rolled to a desired diameter and electrically welded by submerged arc or automatic wire welding equipment as necessary for full strength of the material and for water tightness in those areas where required. The inside of filter tanks 2 and 3 are preferably grit blasted to white metal to remove all mill scale, weld slag and rust. Exterior surfaces of housing 10 should be treated to prevent rusting as by applying a coating of epoxy or other suitable material. A coating of coal tar epoxy or other suitable material is applied to interior surfaces of housing 10 to prevent rusting and corrosion thereof.

As best illustrated in FIG. III, divider plate 12 extends diametrically across the inside of housing 10 and has opposite edges welded or otherwise secured to opposite sides of the housing. Divider plate 12 extends downwardly and is welded or otherwise secured to the bottom 14 of housing 10. The upper edge 13 of divider plate 12 is spaced downwardly from the upper end of housing 10 permitting overflow of water from compartment 2 into compartment 2 preventing overflow of liquid from housing 10 as a result of power failure or other unforeseen circumstance which might render the control system inoperative, as will be hereinafter more fully explained. Suitable stiffner elements such as angle members 15, are welded or otherwise secured to divider plate 12 and inner walls of housing 10 to provide sufficient structural strength to housing 10 and divider plate 12.

A floor 16 is formed in a lower portion of each of the compartments 2 and 3 for supporting filtration media comprising upper and lower layers of graded filter material 18 and 20 respectively. Floor 16 is positioned above the bottom 14 of housing 1 forming collection tanks 22 and 23 therebetween.

Each layer 18 of filter material is, for example, composed of graded particles of anthracite or ground fired clay. Each layer 20 of filter material is, for example, composed of graded sand. The upper layers 18 are preferably approximately 24 inches thick and lower layers 20 are preferably approximately twelve inches thick. However, it should be appreciated that layers composed of other material may be employed without departing from the spirit of our invention, the specified materials and dimensions being merely explanatory of an operative embodiment.

Suitable supporting structure, such as angle members 24 and gaskets 26, are provided for maintaining floor 16 in a desired position. Gasket 26 may be constructed of any suitable material such as neoprene for sealing about edges of floor 16 to insure proper flow of backwash air and water through underdrain screens 32 as will be hereinafter more fully explained. Floor 16 is secured to angle members 24 by suitable means such as bolts 28 to maintain floor 16 in sealing relation with gasket 26.

Floor 16 has spaced openings formed therein and sleeves 30 extend downwardly therefrom and are welded or otherwise secured about the periphery of the openings.

As best illustrated in FIGS. VII and VIII underdrain distributors 32 comprise cylindrical screens having a plurality of conical shaped apertures 34 extending therethrough. A substantial number of screens 32 are provided to permit flow of air and water therethrough without excessive pressure loss. Each cylindrical screen 32 has closed upper and lower ends to prevent entry of filter media such as sand from the lower layer 20 thereinto. The bottom of screen 32 has an opening formed therein about which a downwardly extending tube 36 is secured. Tube 36 extends through sleeve 30 secured about openings in floor 16 in housing 10. Screens 32 are removable and are installed prior to depositing the layers 18 and 20 of filtration media in housing 1. If it is deemed expedient to do so posts 38 may be provided between the bottom 14 of housing 10 and floor 16 to provide structural reinforcing to floor 16 sufficient to carry the weight of layers of filtration media 18 and 20.

As best illustrated in FIG. VII, a vent pipe 40 has a lower end extending through floor 16 communicating with collection tank 22 below floor 16. The upper end 42 of vent pipe 40 is disposed adjacent the upper end of housing 10 and preferably at a level above the upper edge 13 of the divider plate 12.

As best illustrated in FIGS. I and III vent openings 44, covered by expanded metal or other suitable screen material, are provided adjacent the upper end of housing 10. A cover 45 is secured over the open upper end of the housing 10 by suitable means, such as over-center toggle locking devices 46.

Suitable openings are formed in housing 10, such as hand holes 48 and 49 extending through a wall of the housing above and below floor 16 to facilitate periodic cleaning of the filter apparatus. Suitable drain openings 50 extend through lower portions of the wall of housing 10 adjacent the bottom 14 thereof. A ladder 52 is bolted or otherwise secured to housing 10 providing ready access to the upper end thereof allowing removal of cover 45 for inspection.

As best illustrated in FIGS. I and II, inlet piping 60 comprises a feed line 61 connectable to the outlet of a secondary sewage treatment facility S (FIG. IX) and has another end connected by a suitable coupling 62 to a tee 63, the opposite ends of which are connected with inlet openings of solenoid actuated butterfly valves 65 and 75. Valves 65 and 75 have outlet passages connected by elbows 66 and 76 with influent pipes 67 and 77. Pipes 67 and 77 are of identical construction and as best illustrated in FIG. VI comprised tubular members having a downwardly extending elbow like end section 68. A deflector plate 69 is secured, as by a bolt 70 and nuts 71, across the outlet opening 72 in tube 67. Fluid flowing through tube 67 and elbow 68 strikes the upper surface of deflector plate 69 and is dispersed over the upper surface of the upper layer 18 of filtration media to minimize cavitation of the filter material.

As will be hereinafter more fully explained valves 65 and 75 are controlled by solenoid devices 65a and 75a. Each of the solenoid devices 65a and 75a have dual windings therein to provide positive opening and closing forces when electrical current is directed to appropriate terminals therein.

As best illustrated in FIGS. II and III outlet pipes 80 and 81 extend through openings extending through walls of housing 10 communicating with collection tanks 22 and 23 below floor 16. Line 80 is connected through elbow 82 and pipe 84 with the tee 86. One of the openings in tee 86 is connected by a tube 88 to the inlet opening of valve 90. Valve 90 is controlled by suitable actuating means such as solenoid device 90a. The outlet opening of valve 90 is connected by a pipe 92, extending through a wall of backwash storage tank 4, with the inside of tank 4.

The outlet pipe 81, communicating with collection tank 22 below compartment 2 of filter apparatus 1, is connected by an elbow 83 and pipe 85 to a tee 87. An opening of tee 87 is connected by a tube 89 with the inlet opening of a valve 91. The outlet opening of valve 91 is connected by a pipe 93 with the inside of backwash storage tank 4. Valve 91 is actuated by suitable means such as solenoid 91a.

Backwash storage tank 4 comprises an outer housing 94, as will be hereinafter more fully explained. Referring to FIGS. I, III and IV each compartment 2 and 3 of filter apparatus 1 has means associated therewith for removing backwash water and solid particles suspended therein from the respective compartments. Compartment 3 has a backwash overflow trough 100 disposed therein, the end of said trough communicating backwash return line 102 extending through an opening formed in the wall of housing 10. Line 102 is connected to an inlet passage of butterfly valve 104 controlled by solenoid actuating device 104a. The outlet passage of valve 104 is connected by an elbow 106 to a coupling 108 communicating with line 110.

Compartment 2 of filter apparatus 1 has a backwash overflow trough 101 disposed therein communicating with backwash return line 103 extending through an opening formed in the wall of the housing 10. Return line 103 is connected through the butterfly valve 105, controlled by actuating apparatus 105a, and elbow 107 with coupling 108.

An overflow pipe 111 communicates with an opening formed in an upper portion of the wall of housing 10 and extends downwardly having a lower end communicating with coupling 108.

Head loss sensors or probes 112 and 113 comprise pressure actuated switches located adjacent the top of filter housing 10 and close when water level reaches a predetermined maximum allowable limit. Sensors 112 and 113 deliver signals to initiate the backwash cycle.

Liquid delivered through distributors 67 or 77 will flow through the filtration media 18 and 20 to the backwash storage tank 4 until the head loss through the media causes the water level above the media to rise to an elevation corresponding to sensing probe 112 or 113 which initiates a programmed cycle for diverting flow of liquid to the other compartment 2 or 3 and initiates air and water backwash cycles as will be hereinafter more fully explained.

Referring to FIGS. I and II backwash storage tank comprises an outer housing 94 having a bottom 114 and a top 116.

A weir box 118, best illustrated in FIGS. I AND V is secured to a wall of housing 94 and has a 90° V-shaped notch 120 formed therein and positioned at an elevation substantially equal to a predetermined maximum liquid level to be maintained in backwash storage tank 4. An outlet opening is formed in the wall of housing 94 communicating with the inside of weir box 118 and has an outlet discharge pipe 122 connected thereto.

The pipe 92 is preferably positioned at an elevation slightly above the upper surfaces of upper layers 18 of filter material in housing 10 to provide a layer of liquid to prevent cavitation and drying of the layer 18 of filter material.

A drain plug 123 closes a drain passage formed in the lower portion of tank 4. The top 116 of tank 4 preferably has an entrance passage formed therein and a suitable cover 116a is positioned thereover to allow entry into the tank for periodic cleaning. A ladder 124 is connected to the outside of tank 4 and a ladder 125 is mounted on the inside thereof to facilitate inspection and maintenance.

Means is provided for pumping liquid from backwash storage tank 4 into collection tank 22 at the bottom of housing 10 of filter apparatus 1 for forcing water upwardly through filter media 18 and 20. In the particular embodiment of the invention illustrated in the drawing a sump pump 130 is mounted inside tank 4 and the lower end of hose 132 is connected to the high pressure side thereof. The upper end of hose 132 is connected through line 134, tee 135 and line 136 to a gate valve 137. The gate valve 137 controls the back pressure and consequently the output of pump 130. A pressure gauge 135a, connected to tee 135 disposed between pump 130 and gate valve 137, is employed for regulating the flow of fluid through valve 137. The outlet opening of valve 137 is connected through an elbow 138 and check valve 139 to a tee 140. Tee 140 is connected through lines 141 and 142 and elbows 143 and 144 respectively.

Elbow 144 is connected through tee 146 and pipe 148 to the inlet passage of valve 150 controlled by solenoid actuating devices 150a. The outlet passage of valve 150 is connected through pipe 152 to tee 86 which communicates through pipes 80 and 84 with collection tanks 23 under floor 16 of filter apparatus 1.

Elbow 183 is similarly connected through tee 147 and pipe 149 to a valve 151 controlled by solenoid device 151a. Valve 151 communicates through line 153 with tee 87 which is in turn connected through pipes 81 and 85 with collection tank 22 under floor 16 of compartment 2 of filter apparatus 1.

Suitable means such as motor 155 is provided for driving air compressor 156.

A source of pressurized air, such as compressor 156, is connected through a line 160, check valve 161 and elbow 162 to a tee 163.

Tee 163 is connected through check valves 164 and 165 with tees 146 and 147, respectively.

As best illustrated in FIG. I a pressure switch 165 communicates with the inside of a backwash storage tank 4 to indicate when the tank is filled with water. If the tank is not full, the backwash cycle is stopped until the flow of water from the operating compartment 2 or 3 contributes enough water to fill the tank. Switch 165 preferably opens the control circuit until water rises to a level approximately equal to the level of weir 120.

Suitable means, such as float switch 166, is operably connected to pump 130 to preclude the possibility of operating the pump without sufficient water in the tank. Switch 166 is positioned to open the control circuit as the falling water level approaches the level of the intake of the pump.

Control circuitry, schematically illustrated in FIGS. XI and XII of drawing, is enclosed in a suitable control cabinet 170 and pilot lights P1, P2, P3 and P4, preferably mounted on the face of cabinet 170, are connected to signify which filter is in a normal filter cycle and which is in a backwash cycle.

The control circuit generally comprises a pair of four pole relays R1 and R2, a pair of twelve pole relays R3 and R4 which are energized and de-energized by a master timer TR1 comprising a programmed cam type apparatus which is employed to control the duration of various operating cycles. A typical program of an eighteen minute operating cycle is illustrated in FIG. XII. Specific durations of the various operating cycles are merely exemplary and the master control timer TR1 may be programmed to provide cycles of different duration to provide optimum result under specific operating conditions.

The wiring diagram illustrated in FIG. XI is believed to be self-explanatory and further discussion thereof is not deemed necessary.

The operation and the function of the apparatus hereinbefore described is as follows:

Normal operation of the filter apparatus 1 is by gravity fed from a secondary process clarifier eliminating the requirement for pumping. Flow through layers of filtration media 18 and 20 to the backwash storage tank 4 continues until sufficient solids become trapped in the media eventually blocking the waterpath through the media. To overcome the losses through the media the hydrostatic head of liquid increases raising the water level in the operating filter unit 2 or 3. When the hydrostatic head developed approaches the height allowable for that purpose, the filter is considered blinded and must be cleaned before additional filtration can be effectively accomplished.

Under normal operating conditions when filter tank 2 is being employed to filter, inlet valve 75 and outlet valves 90 and 91 will be open while all other valves are closed.

When the filtration media in compartment 2 becomes clogged, the water level therein rises until pressure switch 113 is actuated. Referring to the wiring diagram illustrated in FIG. XI, it should be readily apparent that when switch 113 is closed electrical current is directed through normally closed contact R2-1 of relay R2 energizing the coil of relay R1. As relay R1 is energized, circuits are completed through normally open contacts R1-2 and R1-3 energizing the coil of relay R3 and through normally closed contacts R4 energizing the motor of master timer TR1.

When the motor of timer TR1 is energized the timing apparatus is automatically stepped through the sequence illustrated in FIG. XII. Contacts TR1-1 are closed throughout the duration set on the timer and the motor of timer TR1 and the coil of relay R3 are held in an energized condition.

When coil of relay R3 is energized the normally closed contacts R3-9 of relay R3 are opened causing pilot light PL3, indicating that filtration is being accomplished in compartment 2, to be turned off and pilot light PL 1, indicating that compartment 2 is in a backwash cycle, to be turned on.

After a time delay of approximately 30 seconds, the inlet valve 65 and outlet valve 90 are opened, diverting flow to filter unit 3 and allowing excess water in compartment 2 to drain through line 67, valve 65, tee 63, inlet valve 75, and line 77 into compartment 3. This reduces the quantity of waste water which will be returned to the previous stage of the sewage treatment system while backwash is being accomplished. Such is accomplished when contacts TR1-2 are closed directing current through contacts R3-2 of relay R3 energizing coils 65a and 90a of the respective solenoids.

After a further time delay of, for example, 3 minutes, contacts TR1-3 of timing apparatus are closed directing current through contacts R3-3 of relay R3 energizing the coil 75a' of the solenoid controlling inlet valve 75 for closing same.

After a further time delay of approximately 2 minutes, contacts TR1-4 of the timing apparatus are closed directing current through contacts R3-4 of relay R3 to solenoid 91a' to close the outlet valve 91 associated with filter unit 2, to solenoid 151a to open the backwash valve 151 associated with filtration unit 2, and to solenoid 105a to open backwater waste valve 105. Current through R3-5 to magnetic starter S1 drives blower 155 to provide approximately two minutes of air scour. The air scour loosens the filter media and helps to separate the solid particles from the media.

Immediately following the air scour cycle, contacts TR1-5 of timer mechanism TR1 are closed, directing current through R3-6 to starter S2 starting the water wash pump motor 130 which runs for approximately 5 minutes provided pressure switch 165 in backwash storage tank 4 is closed indicating that the tank is full.

The master timer TR1 then closes contacts TR1-6 routing the current through contacts R3-7 of relay R3 to solenoids 151a' and 105a' to close the backwash valve 151 and backwash waste valve 105.

After the total elapsed time has reached the cycle time of the timer, for example, 18 minutes, the unit is reset and filter unit 2 is ready to be put back into operation when the operating filter unit 3 becomes blinded which will result in energizing the coil of relays R2 and R4 when pressure switch 112 is closed by the hydrostatic head.

When pressure switch 112 closes, the motor of timer TR1 will be energized stepping the control through the above described sequence except that current will be directed through the contacts of relay R4 for actuating valves associated with the filter unit 3.

It should be noted that the energizing circuit for the coil of relay R1 is routed through normally closed contacts R2-1 of relay R2 and that the energizing circuit for the coil of relay R2 is rounted through normally closed contacts R1-1 of relay R1. This interlocking circuitry prevents simultaneous energization of relays R1 and R2 which would be necessary to backwash filter units 2 and 3 simultaneously.

It should further be noted that energizing circuits of coils of relays R3 and R4 are similarly routed through contacts R4-8 and R3-8 preventing simultaneous energization thereof.

Suitable circuit breakers MCB and overload heaters OL1 and OL2 are provided.

From the foregoing it should be readily apparent that we have developed a filtration system particularly adapted to provide continuous duty filtration of effluent delivered from a secondary process clarifier to remove solid particles therefrom. The dual filtration system incorporated in our filtration apparatus allows filtration of effluent through a first filtration unit 2 while a second filtration unit 3 is being backwashed. The control system incorporated in our filtration apparatus automatically switches a filtration unit from a filter cycle to a backwash cycle when the hydrostatic head required to force water through the filter media becomes excessive. In the event of a power failure liquid will flow over the upper edge 13 of divider wall 12 into the adjacent compartment if one of the valves 90 or 91 is closed. Valves 90 and 91 are preferably adapted to remain open at all times except during actual backwash to permit continuous flow during power failure.

It should be appreciated that the above description is that of a preferred embodiment of our invention and that other and further forms thereof may be devised without departing from the basic concept of our invention.

Having described our invention we claim:

1. A method of filtering liquid comprising the steps of: providing first and second filter beds positioned in outlet openings in first and second containers; directing flow of liquid to be filtered through the first filter bed; sensing the level of liquid in each of the containers; diverting flow of liquid to be filtered through the second filter bed when the level of liquid in the first container exceeds a predetermined level; transferring liquid from the first container to the second container; removing solid particles from the first filter bed while flow of liquid is maintained through the second filter bed; directing flow of liquid through the first filter bed when the level of liquid in the second container exceeds a predetermined level; transferring liquid from the second container to the first container; and removing solid particles from the second filter bed while flow of liquid is maintained through the first filter bed.

2. The method of claim 1 with the addition of the step of maintaining a volume of filtered liquid; and wherein the step of removing solid particles from the first and second filters comprises pumping filtered liquid from the said volume upwardly through the filter bed.

3. The method of claim 2 with the addition of the step of directing pressurized gas through the first and second filter beds to agitate the filter material and to remove solid particles therefrom prior to pumping filtered liquid therethrough.

4. The method of claim 1 with the addition of the steps of generating a plurality of signals of timed duration responsive to the sensing of the level of liquid in the containers when a filter bed becomes laden with solid particles; diverting liquid to be filtered through the other filter bed responsive to the first signal; delivering pressurized gas through the filter bed laden with solid particles responsive to a second signal; and backwashing the filter bed laden with solid particles responsive to a third signal.

5. A method of filtering liquid comprising the steps of; providing first and second filter beds positioned in outlet openings in first and second containers; directing the flow of liquid from a source of liquid to be filtered through the first filter bed to a volume of filtered liquid; sensing the level of liquid in the first container; generating a first signal responsive to sensing the level of liquid in the first container; diverting liquid to be filtered from the source through the second filter bed responsive to the first signal; generating a second signal; delivering backwash fluid from the volume of filtered liquid through the first filter responsive to the second signal; sensing the level of liquid in the second container; generating a third signal responsive to the sensing of the level of liquid in the second container; diverting the flow of liquid to be filtered from the source through the second filter bed responsive to the third signal; generating a fourth signal; and delivering backwash fluid from the volume of filtered liquid through the second filter responsive to the fourth signal; and alternately repeating the aforesaid steps responsive to the level of liquid in the respective containers.

6. The method called for in claim 5 with the addition of the steps of generating an additional signal prior to generating the second and fourth signals; and delivering pressurized gas through the first and second filters responsive to said additional signals.

7. The method called for in claim 5 with the addition of the steps of transferring the liquid from the first container to the second container responsive to the fourth signal.

8. A filtering device comprising a storage container for liquid to be filtered; a backwash storage tank; first and second filter containers; first and second filter media in said filter containers; an inlet line to deliver liquid from the storage container to each such filter container above the filter therein; an outlet line adapted to deliver liquid from each such filter container from below the filter therein to the backwash storage tank; a waste conduit communicating with each filter container above the filter therein to carry out backwash fluid; means to pump liquid from the storage container through the respective outlet lines; sensor means in each filter container adapted to sense the level of liquid in each container; valve means in each inlet line; valve means in each outlet line; valve means in each backwash waste conduit; valve actuating means operably connected to each said valve means; pump actuating means operably connected to said pump means, said actuating means being arranged to open and close each said valve means and to actuate said pump means; control means actuated by the sensor means and operably connected to the valve actuating means and pump actuating means adapted to selectively actuate the valve means and the pump means.

9. The combination called for in claim 8 with the addition of blower means communicating with each outlet line; blower actuating means operably connected to the blower means; blower control means actuated by the sensor means and operably connected to the blower actuating means to selectively actuate the blower means and cause air to be delivered through the outlet lines and the filters.

10. The combination called for in claim 8 wherein the filter containers are in a common housing; and a vertical wall positioned centrally of the housing forming first and second filter containers.

11. The combination called for in claim 10 with the addition of a floor in the housing spaced rom the bottom of the housing dividing the lower portion of the housing into first and second collection chambers on opposite sides of the vertical wall; wherein the filters are positioned above said floor; the outlet lines communicate with said compartments; and the inlet lines communicate with the respective containers above said filter.

12. The combination called for in claim 10 wherein the upper edge of the wall is spaced downwardly from the top of the housing.

13. The combination called for in claim 11 wherein the waste conduits communicate with the respective filter containers above the elevation of the inlet lines.

* * * * *